June 3, 1924.
G. A. HOLMES
SNAP FASTENER SOCKET
Filed Nov. 17, 1922
1,496,637
Fig. 1.
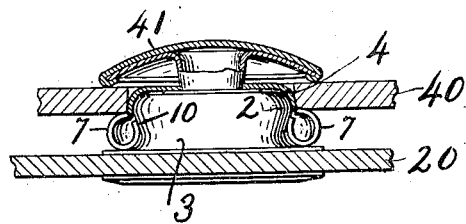
Fig. 2.
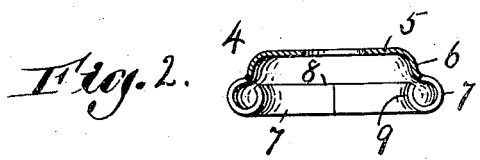
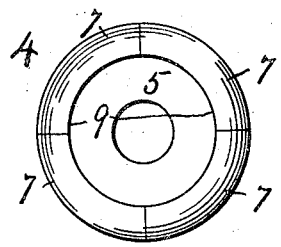
Fig. 3.
Fig. 4.
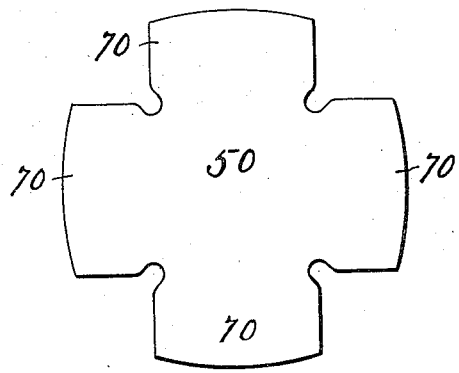
Inventor
George A. Holmes
by Jos. P. Livermore
Attorney Patented June 3, 1924.

1,496,637

UNITED STATES PATENT OFFICE.

GEORGE A. HOLMES, OF NEWTON CENTER, MASSACHUSETTS, ASSIGNOR TO UNITED STATES FASTENER COMPANY, A CORPORATION OF MAINE.

SNAP-FASTENER SOCKET.

Application filed November 17, 1922. Serial No. 601,611.

*To all whom it may concern:*

Be it known that I, GEORGE A. HOLMES, a citizen of the United States, and resident of Newton Center, in the county of Middlesex and State of Massachusetts, have invented an Improvement in Snap-Fastener Sockets, of which the following description, in connection with the accompanying drawing, is a specification, like reference characters on the drawing designating like parts.

This invention relates to the socket member of a stud and socket fastener of the kind in which the stud has a bulbous head a little larger than the entrance opening of the socket, which is made resiliently expansible at the mouth or opening so that the larger portion of the stud may be crowded through the socket opening and will remain confined in the socket by the engagement of the mouth or rim of the socket with the enlarged portion of the stud head, while surrounding the neck of the stud.

The object of the invention is to increase the resilience of the spring mouth and the effectiveness of the engagement of the socket with the stud, and to produce a very simple, inexpensive and durable socket.

Fig. 1 is a sectional view of a snap fastener having a socket embodying this invention, the stud and socket members being shown attached to the fabric or material with which they are to be used as a separable fastener;

Fig. 2 is a section of the socket proper detached;

Fig. 3 is an underneath plan or face view of the socket as seen looking into the mouth or opening for the entrance of the stud; and Fig. 4 is a plan of the metal blank from which the socket shown in Figs. 2 and 3 may be made.

Referring to Fig. 1, the stud member may be of usual construction, having an enlarged head portion 2 connected by a neck 3, of somewhat smaller diameter, with the base of the stud member which is secured in the usual way to one flap or layer 20 of the fabric or material with which the fastener is to be used.

The socket member comprises the socket proper 4 connected with the flap or fabric layer 40 by an eyelet 41, the head of which appears upon the outer surface of the material and may have the appearance of an ordinary button as is usual with this type of snap fastener.

The socket proper, shown detached from the other components of the fastener in Figs. 2 and 3, may be made from a blank such as is shown in Fig. 4, having a continuous central portion 50 surrounded by a number of marginal projecting portions or wings 70 which are continuous with the central portion 50, but otherwise are separate from one another.

The socket proper comprises a main body portion having a substantially flat central portion 5 surrounded by a continuous flange 6 forming a shallow cup or saucer-shaped body portion, from the margin of which extend separate resilient continuations 7 which near their meeting point with the flange portion 6 of the body proper extend outward as shown and then curve downward, inward, and upward and terminate inside of the body of the socket as shown at 8, Fig. 2, near the junction of the continuous flange 6 with the separate continuations 7.

The mouth or entrance opening for the reception of the stud head thus has its narrowest or most contracted point at 9 a short distance within the cavity of the socket, and by having the mouth or socket entrance formed in the portion of the socket that is composed of separate sections or wings it is made resiliently expansible, and the yielding spring action takes place substantially from the inner extremities of the sections at 8 to the junction of the separate sections with the continuous peripheral flange 6 of the body portion.

For convenience the continuous portion 5, 6, may be referred to as the main or body portion, and the series of separate wings 7 as the spring mouth portion of the socket, and it will be seen that externally the spring mouth portion extends outward from the body portion, forming an outwardly extending shoulder or flange for engagement with the material 40 in the attachment of the fastener to the fabric, which is pressed or clamped between said shoulder and the marginal part of the attaching eyelet 41.

Furthermore, the construction of the spring mouth portion affords a long, or double, spring action, since the mouth portion, as a whole, springs outward from its connection with the body portion in the act of expanding the socket entrance as the head of the stud is crowded therethrough, and at the same time the upwardly and inwardly projecting portion of the mouth springs outward relatively to the outer portion of the mouth, thus affording a considerable extent of expansion or enlargement of the stud entrance without straining the material beyond its elastic limit.

Furthermore, by having the stud engaged primarily by the portion of the spring sections which extend upward into the cavity of the stud, the said sections after recovering or reacting from the expansive force resulting from the crowding of the stud head therethrough will bear inward and upward against the enlarged portion of the stud head, as indicated at 10 in Fig. 1 and will thus tend to draw the stud head up into the socket and to hold it firmly and without such looseness or play between the stud and socket as is commonly found with the constructions of the spring socket commonly employed in this general type of snap fasteners.

I claim:—

A snap fastener socket composed of a one-piece body portion having a central portion surrounded by a continuous flange, and an expansible resilient mouth portion consisting of separate resilient integral continuations extending outward from the periphery of said flange, and being curved downward, inward, and upward, and separately terminating within the cavity of the socket in proximity to their junction with the flange.

GEORGE A. HOLMES.